(12) United States Patent
McDonald et al.

(10) Patent No.: US 9,140,586 B2
(45) Date of Patent: Sep. 22, 2015

(54) REMOVABLE SENSOR PORT INSERT APPARATUS

(71) Applicant: General Electric Company, Schenectady, NY (US)

(72) Inventors: Benjamin Edward McDonald, Holliston, MA (US); Toan Huu Nguyen, Needham, MA (US); Mykhaylo Barsukov, Acton, MA (US)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 13/626,395

(22) Filed: Sep. 25, 2012

(65) Prior Publication Data
US 2014/0083181 A1    Mar. 27, 2014

(51) Int. Cl.
| | | |
|---|---|---|
| *G01D 11/30* | (2006.01) | |
| *G01F 1/66* | (2006.01) | |
| *G01F 15/18* | (2006.01) | |
| *F16L 41/00* | (2006.01) | |

(52) U.S. Cl.
CPC  *G01D 11/30* (2013.01); *G01F 1/66* (2013.01); *G01F 15/18* (2013.01); *F16L 41/005* (2013.01)

(58) Field of Classification Search
CPC .............................. G01F 15/14; F16L 41/005
See application file for complete search history.

(56) References Cited

U.S. PATENT DOCUMENTS

| | | | |
|---|---|---|---|
| 6,475,151 B2 | 11/2002 | Koger et al. | |
| 6,776,762 B2 | 8/2004 | Erikson et al. | |
| 7,063,666 B2 | 6/2006 | Weng et al. | |
| 7,103,960 B2 | 9/2006 | Aime | |
| 7,247,979 B2 * | 7/2007 | Umina | 310/348 |
| 7,913,806 B2 | 3/2011 | Pabon et al. | |
| 8,186,229 B2 * | 5/2012 | Allen | 73/861.18 |
| 8,232,818 B2 * | 7/2012 | Desta et al. | 324/756.01 |
| 2003/0080563 A1 * | 5/2003 | Roberts et al. | 285/354 |
| 2013/0098167 A1 | 4/2013 | McDonald et al. | |
| 2013/0219707 A1 | 8/2013 | Sui et al. | |

* cited by examiner

*Primary Examiner* — Lisa Caputo
*Assistant Examiner* — Tran M Tran
(74) *Attorney, Agent, or Firm* — Barclay Damon LLP

(57) ABSTRACT

An apparatus configured for insertion into a sensor port of a flow cell is described herein. The apparatus includes an insert body, a sensor located in the cavity of the insert body, and an insert body holding nut and a sensor holding nut threaded to the interior surface of the sensor port.

20 Claims, 7 Drawing Sheets

REMOVABLE SENSOR PORT INSERT APPARATUS

BACKGROUND OF THE INVENTION

The subject matter disclosed herein relates to an insert apparatus configured for insertion into a sensor port of a flow cell.

Flow meters, including ultrasonic flow meters, employ sensors to determine the characteristics (e.g., flow rate, pressure, temperature, etc.) of liquids, gases, etc. flowing in conduits of different sizes and shapes. Knowledge of these characteristics of the fluid can enable other physical properties or qualities of the fluid to be determined. For example, in some custody-transfer applications, the flow rate can be used to determine the volume of a fluid (e.g., oil or gas) being transferred from a seller to a buyer through a conduit to determine the costs for the transaction, where the volume is equal to the flow rate multiplied by the cross sectional area of the conduit.

A sensor can be installed in a sensor port of a flow cell using an insert body that is mounted within the sensor port. In some installations, the insert body is welded or otherwise permanently fixed in the sensor port, preventing removal or replacement of the insert body in a timely manner. In other installations, a flange is used to install the insert body in the sensor port. The use of welds and flanges to install an insert body in a sensor port typically requires that a portion of the installation be external to the flow cell, which requires additional space and makes the installation more susceptible to damage. In other installations, an insert body is threaded into the sensor port. While the threading interface permits removal and replacement, the threads can be susceptible to leaking. In addition, the rotation of the insert body required for installation often makes it difficult to accurately align and orient sensors and insert bodies when required. In addition, for each of these different types of insert body installations, in order to remove or replace a sensor in an insert body, the insert body often must be removed, which requires a shutdown of the system that the flow cells are monitoring to remove the fluid and pressure from the flow cell.

The discussion above is merely provided for a general background information and is not intended to be used as an aid in determining the scope of the claimed subject matter.

BRIEF DESCRIPTION OF THE INVENTION

An apparatus configured for insertion into a sensor port of a flow cell is disclosed. The apparatus includes an insert body, a sensor located in the cavity of the insert body, and an insert body holding nut and a sensor holding nut threaded to the interior surface of the sensor port. An advantage that may be realized in the practice of some of the disclosed embodiments of the sensor port insert apparatus is that a sensor can be easily and safely removed and replaced in the field under process conditions. In addition, the insert body can be more accurately oriented and aligned in the sensor port.

In one embodiment, an apparatus configured for insertion into a sensor port of a flow cell is disclosed. The apparatus comprises an insert body comprising a first end, a second end axially opposite of the first end, and a surface defining a cavity having an opening at the first end of the insert body and a base at the second end of the insert body, a sensor located in the cavity and comprising a first portion proximate to the base of the cavity, wherein the first portion of the sensor has a first outer diameter, a first insert body holding nut comprising a first side, a second side opposite of the first side, a center opening having an inner diameter greater than the first outer diameter of the first portion of the sensor, and threads for engaging with a threaded portion of the interior surface of the sensor port, wherein the second side of the first insert body holding nut is proximate to and applies a compressive force against the first end of the insert body, and a sensor holding nut comprising a nut portion comprising a first side, a second side opposite of the first side, and threads for engaging with the threaded portion of the interior surface of the sensor port, and a cylinder portion comprising a center opening having an inner diameter less than the first outer diameter of the first portion of the sensor, wherein the cylinder portion extends from the second side of the nut portion through the center opening of the first insert body holding nut into the cavity, wherein the distal end of the cylinder portion is proximate to and applies a compressive force against the first portion of the sensor.

In another embodiment, the apparatus comprises an insert body comprising a first end, a second end axially opposite of the first end, and a surface defining a cavity, a sensor located in the cavity, a first insert body holding nut comprising a first side, a second side opposite of the first side, a first key way pattern on the first face, and threads for engaging with a threaded portion of the interior surface of the sensor port, wherein the second side of the first insert body holding nut is proximate to and applies a compressive force against the first end of the insert body, and a sensor holding nut comprising a first side, a second side opposite of the first side, a second key way pattern on the first face, and threads for engaging with the threaded portion of the interior surface of the sensor port, wherein the sensor holding nut applies a compressive force against the first portion of the sensor, wherein the first key way pattern is different than the second key way pattern.

In yet another embodiment, the apparatus comprises an insert body comprising a first end, a second end axially opposite of the first end, and a surface defining a cavity having an opening at the first end of the insert body and a base at the second end of the insert body, a sensor located in the cavity and comprising a first portion proximate to the base of the cavity, wherein the first portion of the sensor has a first outer diameter, a first insert body holding nut comprising a first side, a second side opposite of the first side, a center opening having an inner diameter greater than the first outer diameter of the first portion of the sensor, and threads for engaging with a threaded portion of the interior surface of the sensor port, wherein the second side of the first insert body holding nut is proximate to and applies a compressive force against the first end of the insert body, a second insert body holding nut comprising a first side, a second side opposite of the first side, a center opening having an inner diameter greater than the first outer diameter of the first portion of the sensor, and threads for engaging with the threaded portion of the interior surface of the sensor port, wherein the second side of the second insert body holding nut is proximate to and applies a compressive force against the first side of the first insert body holding nut, and a sensor holding nut comprising a nut portion comprising a first side, a second side opposite of the first side, and threads for engaging with the threaded portion of the interior surface of the sensor port, and a cylinder portion comprising a center opening having an inner diameter less than the first outer diameter of the first portion of the sensor, wherein the cylinder portion extends from the second side of the nut portion through the center openings of the first insert body holding nut and the second insert body holding nut into the cavity, wherein the distal end of the cylinder portion is proximate to and applies a compressive force against the first portion of the sensor.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Different parts are indicated with different numerals. Thus, for further understanding of the invention, reference can be made to the following detailed description, read in connection with the drawings in which.

DETAILED DESCRIPTION OF THE INVENTION

Figure 1:
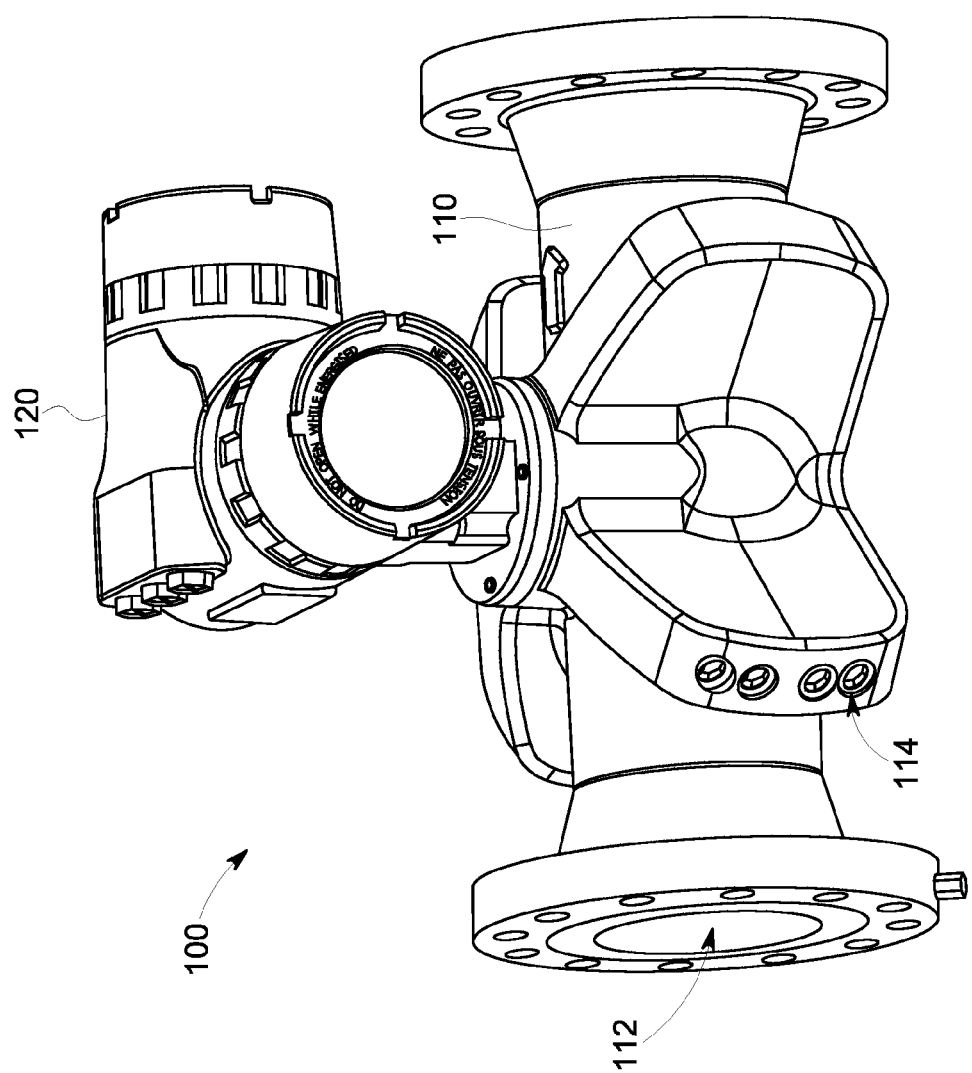
FIG. 1 is a perspective view of an exemplary flow cell apparatus.
Figure 2:
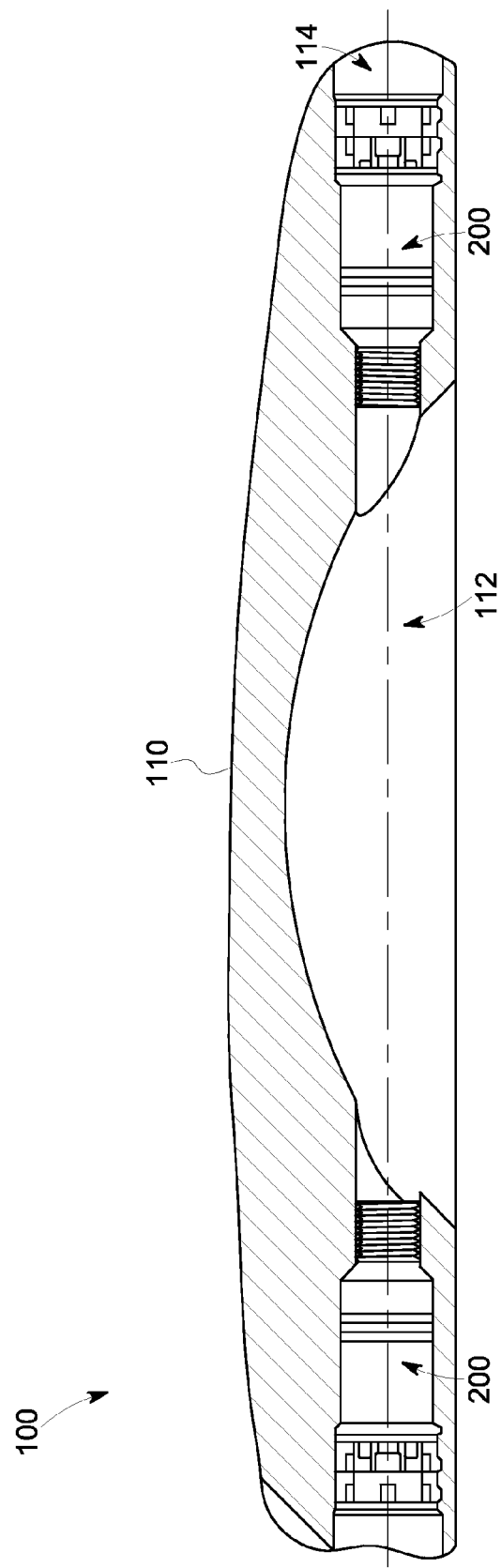
FIG. 2 is a partial cross-section of the exemplary flow cell apparatus of FIG. 1.

FIG. 1 is a perspective view of an exemplary flow cell apparatus 100. FIG. 2 is a partial cross-section of the exemplary flow cell apparatus 100 of FIG. 1. The exemplary flow cell apparatus 100 includes a flow cell 110 having a flow cell bore 112 through which fluid can flow. The flow cell 110 has a plurality of sensor ports 114 in which a sensor port insert apparatus 200 (FIGS. 3-5) is installed. As seen in FIG. 2, the sensor port 114 of the exemplary flow cell 110 is shaped so as to receive and place the exemplary sensor port insert apparatus 200 in physical contact with the fluid in the flow cell bore 112 of the flow cell 110. In one embodiment, where the sensor is an ultrasonic transducer, an ultrasonic signal transmitted from one sensor port insert apparatus 200 travels through the fluid within the flow cell bore 112 and is received by the other sensor port insert apparatus 200. The plurality of ultrasonic transducers are connected to the flow meter 120 to determine the flow rate of the fluid.

Figure 3:
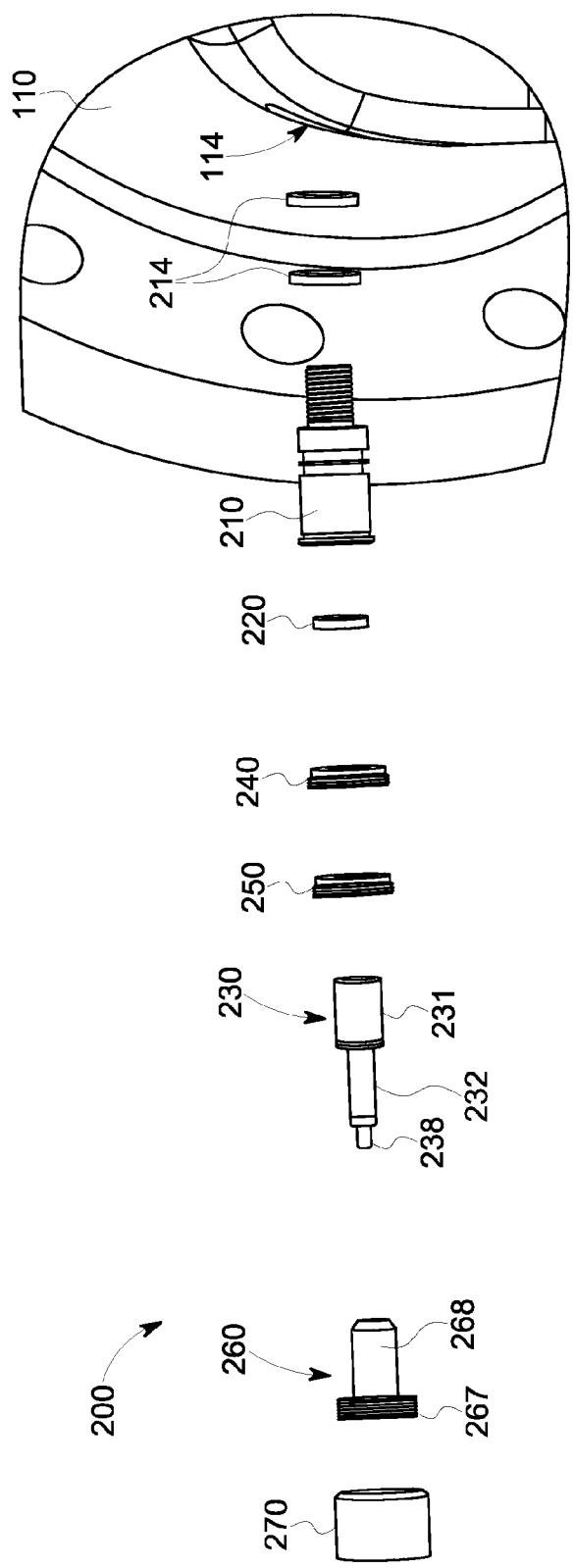
FIG. 3 is an exploded side view of an exemplary sensor port insert apparatus.
Figure 4:
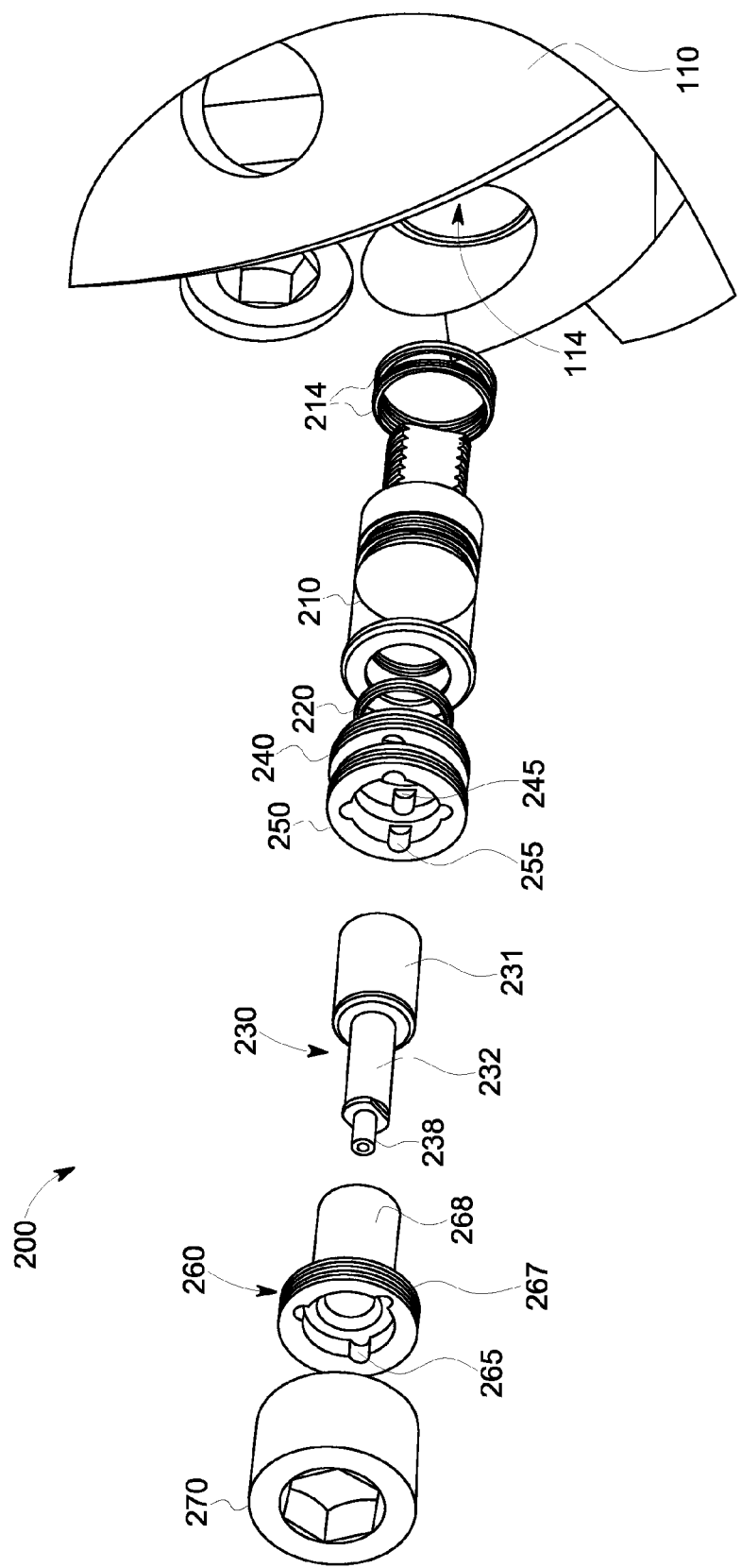
FIG. 4 is an exploded side and perspective view of the exemplary sensor port insert apparatus of FIG. 3.
Figure 5:
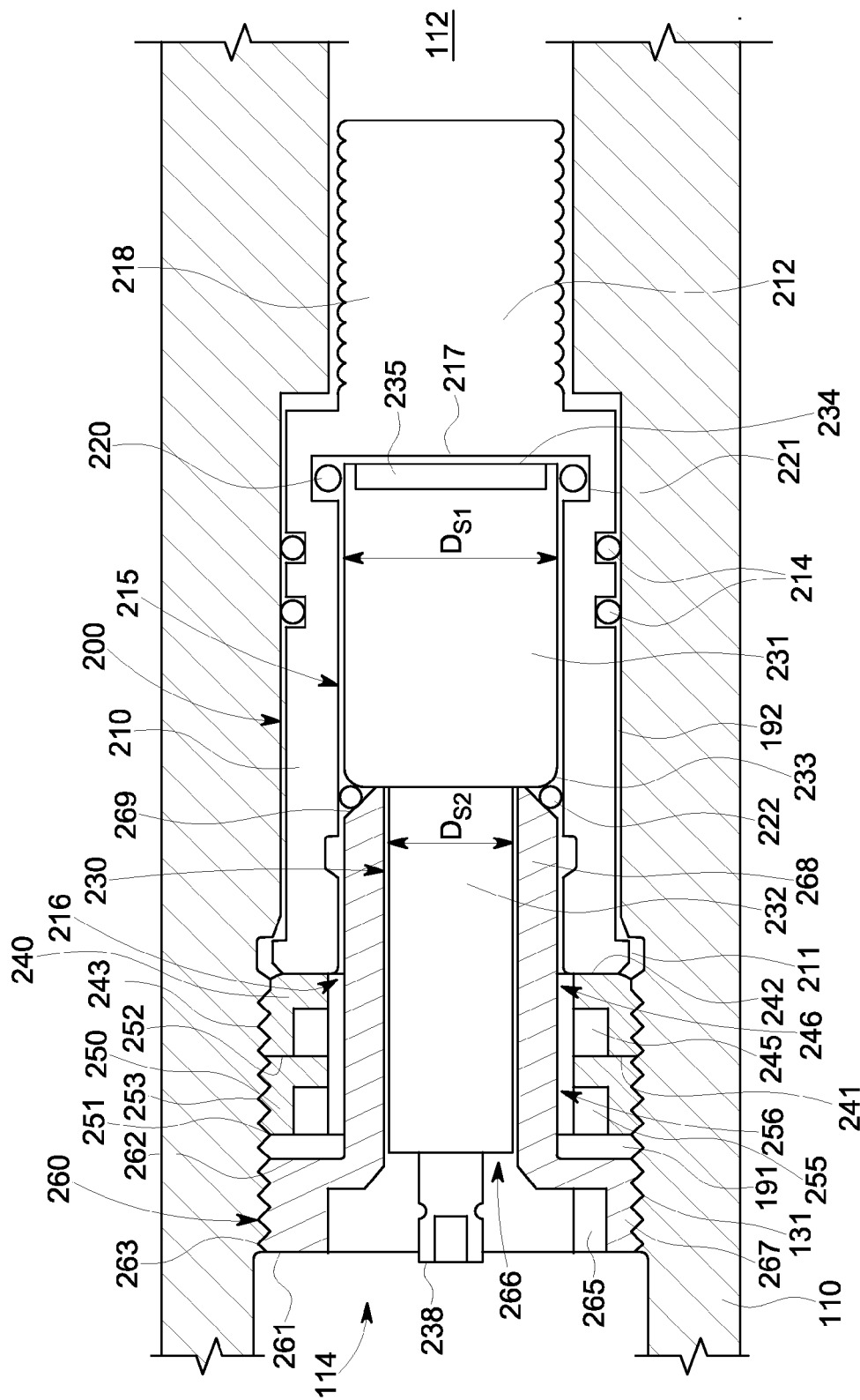
FIG. 5 is a cross-section of the exemplary sensor port insert apparatus of FIGS. 3 and 4.

FIG. 3 is an exploded view of an exemplary sensor port insert apparatus 200. FIG. 4 is an exploded side and perspective view of the exemplary sensor port insert apparatus 200 of FIG. 3. FIG. 5 is a cross-section of the exemplary sensor port insert apparatus 200 of FIGS. 3 and 4. The sensor port insert apparatus 200 is designed to be installed into the sensor ports 114 of the exemplary flow cell 110 of FIG. 1 to monitor fluid in the flow cell bore 112.

In one embodiment, the sensor port insert apparatus 200 includes an insert body 210 configured for insertion into the sensor port 114 of the flow cell 110. One or more insert body o-rings 214 can be installed on the exterior of the insert body 210 to provide a seal between the exterior of the insert body 210 and interior surface of the sensor port 114. As shown in FIG. 5, the inner surface of the insert body 210 defines a cavity 215 having an opening 216 at a first end 211 of the insert body 210 and a base 217 at a second end 212 of the insert body 210, axially opposite of the first end 211. The sensor 230 is located in the cavity 215 of the insert body 210. As used herein, where a first component is referred to as being located in another component, it will be understood that a portion or all of the first component can be located in the other component.

In one embodiment, the sensor 230 includes a first portion 231 proximate to the base 217 of the cavity 215 and a second portion 232 proximate to the opening 216 of the cavity 215. As shown in the exemplary embodiment in FIG. 5, the first portion 231 of the sensor 230 has a first outer diameter ($D_{S1}$) which is greater than the second outer diameter ($D_{S2}$) of the second portion 232 of the sensor 230. This first outer diameter ($D_{S1}$) is the maximum outer diameter of any portion of the sensor 230. The first portion 231 of the sensor 230 has a first end 233 and a second end 234, wherein the second end 234 is axially opposite of the first end 233 and the second end 234 is proximate to the base 217 of the cavity 215 of the insert body 210. In other embodiments, the sensor 230 may only include the first portion 231 proximate to the base 217 of the cavity 215 or may include more than two portions.

In the exemplary embodiment shown in FIGS. 3-5, the sensor 230 is shown as an ultrasonic transducer with the first portion 231 including the housing (which would include a piezoelectric crystal 235), while the second portion 232 includes the back stem and any wiring from the housing to the connector 238. The second end 212 of the insert body 210 is also shown to include an ultrasonic buffer 218. It will be understood that, while the exemplary embodiment of the sensor port insert apparatus 200 is described with reference to an ultrasonic transducer, other sensors may also be used (e.g., pressure sensors, temperatures sensors, etc.) in other embodiments.

In some embodiments, a coupling material may be located between the second end 234 of the second portion 232 of the sensor 230 and the base 217 of the cavity 215. The coupling material can provide a conductive medium by effectively coupling the sensor 230 to, e.g., the ultrasonic buffer 218 in the case of an ultrasonic transducer. The coupling material may be susceptible to leakage. In one embodiment, a groove 221 in the cavity 215 of the insert body 210 proximate to the second portion 232 of the sensor 230 is provided. A sensor face o-ring 220 is installed in the groove 221 to assist in preventing the leakage of the coupling material.

Referring again to FIGS. 3-5, the insert body 210 is held in place by a first insert body holding nut 240 (e.g., a jamb nut). The first insert body holding nut 240 includes a first side 241, a second side 242 opposite of the first side 241, and threads 243 for engaging with a threaded portion 131 of the interior surface of the sensor port 114. As shown in FIG. 5, when the first insert body holding nut 240 is installed and threaded into the sensor port 114, the second side 242 of the first insert body holding nut 240 is proximate to and applies a compressive force against the first end 211 of the insert body 210. The force applied by the first insert body holding nut 240 to the insert body 210 is sufficient to retain the insert body 210 in the sensor port 114 and withstand pressures created by the fluid in the flow cell.

In one embodiment, in order to protect against the possibility of the first insert body holding nut 240 backing out of its installed position, a second insert body holding nut 250 can also be used. The second insert body holding nut 250 includes a first side 251, a second side 252 opposite of the first side 251, and threads 253 for engaging with a threaded portion 131 of the interior surface of the sensor port 114. As shown in FIG. 5, when the second insert body holding nut 250 is installed and threaded into the sensor port 114, the second side 252 of the second insert body holding nut 250 is proximate to and applies a compressive force against the first side 241 of the first insert body holding nut 240. Although the exemplary embodiment shows the use of two insert body holding nuts 240, 250 that are identical, it will be understood that a single insert body holding nut, two different insert body holding nuts, or a greater number of insert body holding nuts could be used.

Figure 7:
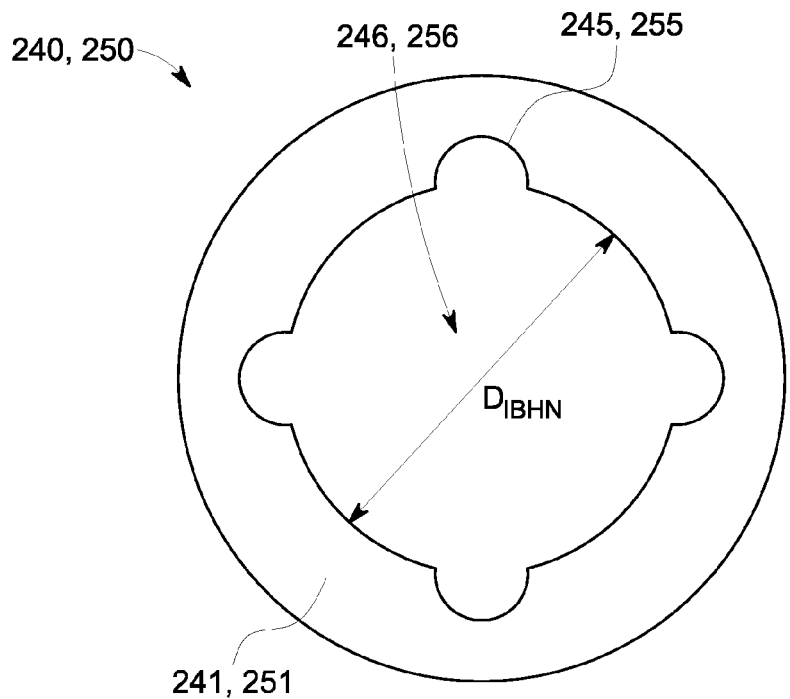
FIG. 7 is a top view of the first side of an exemplary insert body holding nut.

As can be seen in FIG. 5, while the first insert body holding nut 240 and the second insert body holding nut 250 apply compressive forces to retain the insert body 210 in the sensor port 114, the insert body holding nuts 240, 250 do not retain or otherwise engage with the sensor 230. FIG. 7 is a top view of the first sides 241, 251 of the first and second insert body holding nuts 240, 250 showing the center openings 246, 256 having an inner diameter ($D_{IBHN}$). Since the inner diameter ($D_{IBHN}$) of the center openings 246, 256, of the insert body holding nuts 240, 250 is greater than the first outer diameter ($D_{S1}$) of the first portion 231 of the sensor 230 (i.e., the maximum outer diameter of the sensor (230)), the sensor 230 can be installed or removed through the center openings 246, 256 of the insert body holding nuts 240, 250. This eliminates the need to remove or otherwise disturb the insert body 210 when the sensor 230 needs to be removed, replaced, or inspected. Since the insert body 210 is not disturbed, there is no need for a shutdown of the system that the flow cell 110 is monitoring to remove process conditions.

In addition, the use of the insert body holding nuts 240, 250 to retain the insert body 210 without the need for threading and rotating the insert body 210 itself, allows for more accurate alignment of the sensor 230 in the insert body 210. In addition, this design allows for better self-alignment and concentricity of the insert body 210 to maintain specified and required gaps and spaces 192 between the insert body 210 and the interior surface of the sensor port 114 as shown in FIG. 5.

As shown in FIGS. 3-5, the sensor 230 is held in place in the cavity 215 of the insert body 210 by a sensor holding nut 260. The sensor holding nut 260 includes two portions—a nut portion 267 and a cylinder portion 268. The nut portion 267 includes a first side 261, a second side 262 opposite of the first side 261, and threads 263 for engaging with a threaded portion 131 of the interior surface of the sensor port 114. The cylinder portion 268 extends from the second side 262 of the nut portion 267 through the center openings 245, 255 of the insert body holding nuts 240, 250 into the cavity 215 of the insert body 210, surrounding the first portion 231 of the sensor 230. The length of the cylinder portion 268 of the sensor holding nut 260 can be selected to provide the desired gap or space 191 between the second side 262 of the sensor holding nut 260 and the first side of the first insert body holding nut 240 or second insert body holding nut 250.

As shown in FIG. 5, a sensor holding nut o-ring 222 can be installed between the distal end 269 of the cylinder portion 268 of the sensor holding nut 260 and the first end 233 of the first portion 231 of the sensor 230 to keep external elements (e.g., moisture, air) from entering the second end of the cavity 215 of the insert body 210. The distal end 269 of the cylinder portion 268 can have a beveled edge to accommodate the sensor holding nut o-ring 222. In addition, as shown in FIGS. 3 and 4, a threaded plug 270 can be used to seal the sensor port 114.

Figure 6:
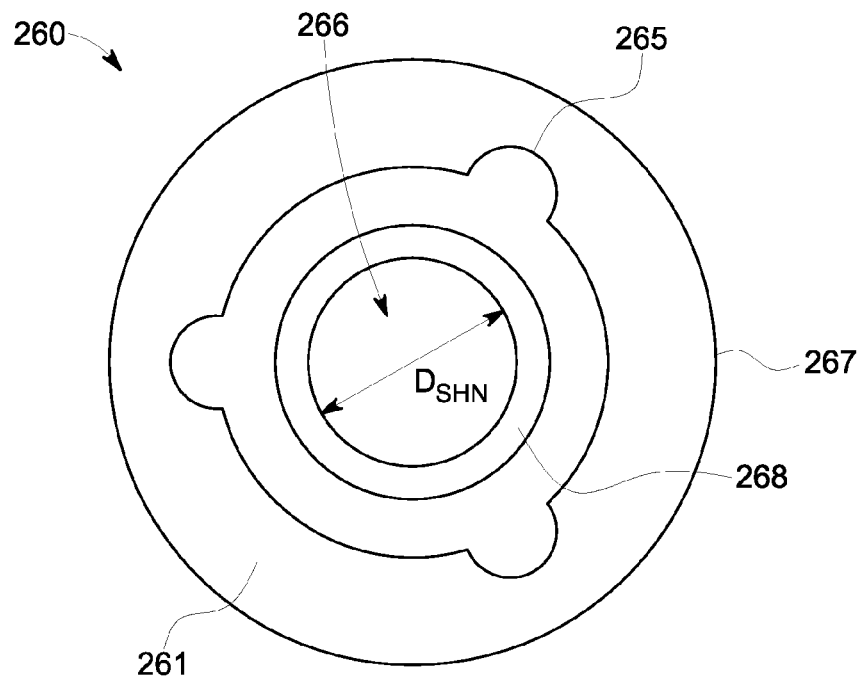
FIG. 6 is a top view of the first side of an exemplary sensor holding nut.

FIG. 6 is a top view of the first side 261 of the sensor holding nut 260, showing the nut portion 267 and the cylinder portion 268. As shown in FIG. 5, when the sensor holding nut 260 is installed and threaded into the sensor port 114, the distal end 269 of the cylinder portion 268 is proximate to and applies a compressive force against the first portion 231 of the sensor 230. Since the inner diameter ($D_{IBHN}$) of the center opening 266 of the cylinder portion 268 of the sensor holding nut 260 is less than the first outer diameter ($D_{S1}$) of the first portion 231 of the sensor 230 (i.e., the maximum outer diameter of the sensor (230)), the sensor 230 cannot be removed without first removing the sensor holding nut 260. It can also be seen from FIGS. 5 and 7 that the inner diameter ($D_{IBHN}$) of the center opening 266 of the cylinder portion 268 of the sensor holding nut 260 is greater than the second outer diameter ($D_{S2}$) of the second portion 232 of the sensor 230 allowing the second portion 232 to extend through the cylinder portion 268 of the sensor holding nut 260.

As discussed, the disclosed sensor port insert apparatus 200 allows for the removal of the sensor holding nut 260 during process conditions, but does not allow for the removal of the insert body holding nuts 240, 250 without shutting down the system. In order to reduce the possibility that a technician, while working with limited or no visual access into sensor port 114, may inadvertently remove the insert body holding nuts 240, 250 under process conditions when intending to remove the sensor holding nut 260, the sensor holding nut 260 can be provided with a different key way pattern than the key way pattern for the insert body holding nuts 240, 250, requiring different tools to remove the different holding nuts. As shown in FIGS. 4-7, the holdings nuts 240, 250, 260 are each provided with a plurality of exemplary key way grooves (or recesses) 245, 255, 265 formed on the center openings 246, 256, 266 of each of their first sides 241, 251, 261. Each of the key way grooves 245, 255, 265 can be formed as semi-circular recesses extending into the first sides 241, 251, 261 of the nuts 240, 250, 260.

Figure 8:
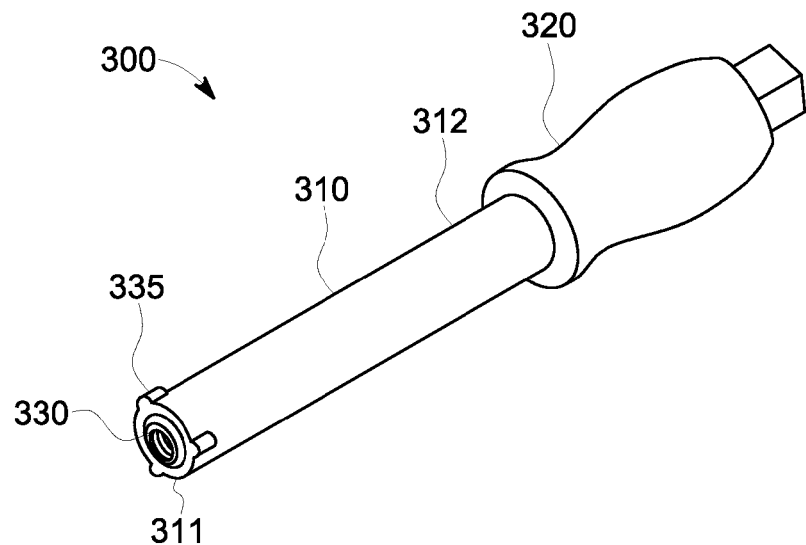
FIG. 8 is a perspective view of an exemplary tool for rotating the exemplary sensor holding nut of FIG. 6.

As shown in FIG. 6, the exemplary key way pattern for the sensor holding nut 260 includes three key way grooves 265, equally spaced along the first side 261 of the sensor holding nut 260. FIG. 8 is a perspective view of an exemplary sensor holding nut tool 300 for rotating (removing or installing) the sensor holding nut 260 of FIG. 6. The sensor holding nut tool 300 includes a shaft 310 having a first end 311 and a second end 312. A handle 320 is located at the second end 312 of the shaft 310. The first end 311 of the shaft 310 includes the face 330 of the sensor holding nut tool 300 that is inserted into the first side 261 of the sensor holding nut 260. The three key ribs 335 located on the first end 311 of the shaft 310 are sized to mate with the key way grooves 265 on the sensor holding nut 260, allowing the sensor holding nut tool 300 to engage and then tighten or loosen the sensor holding nut 260 as required.

Figure 9:
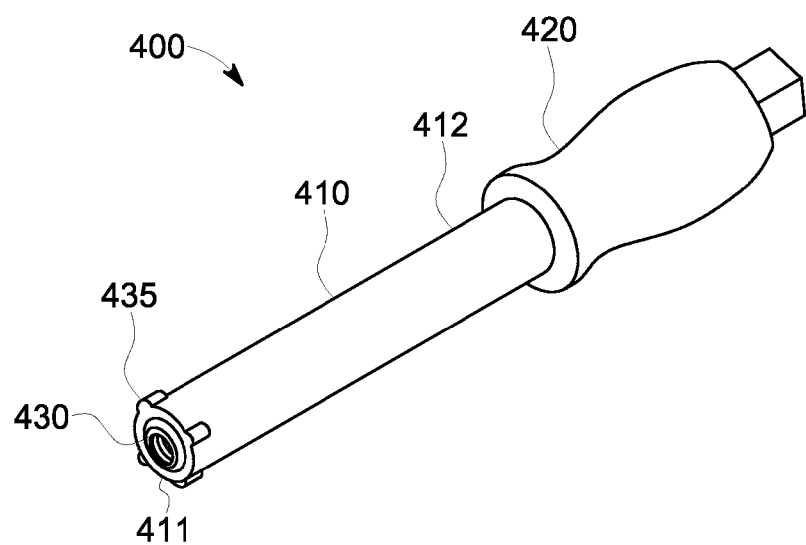
FIG. 9 is a perspective view of an exemplary tool for rotating the exemplary insert body holding nut of FIG. 7

As shown in FIG. 7, the exemplary key way pattern for the insert body holding nuts 240, 250 includes four key way grooves 245, 255, equally spaced along the first sides 241, 251 of the insert body holding nuts 240, 250. FIG. 9 is a perspective view of an exemplary insert body holding nut tool 400 for rotating (removing or installing) the insert body holding nuts 240, 250 of FIG. 7. The insert body holding nut tool 400 includes a shaft 410 having a first end 411 and a second end 412. A handle 420 is located at the second end 412 of the shaft 410. The first end 411 of the shaft 410 includes the face 430 of the insert body holding nut tool 400 that is inserted into the first sides 241, 251 of the insert body holding nuts 240, 250. The four key ribs 435 located on the first end 411 of the shaft 410 are sized to mate with the key way grooves 245, 255 on the insert body holding nuts 240, 250, allowing the insert body holding nut tool 400 to engage and then tighten or loosen the insert body holding nuts 240, 250 as required. Because the key rib pattern of the insert body holding nut tool 400 (having four key ribs 435) will not match the pattern of the sensor holding nut key way grooves 265, the insert body holding nut tool 400 cannot be used to inadvertently remove the insert body holding nuts 240, 250.

It will be understood that different key way patterns can be used in other embodiments, including embodiments where the key way patterns are formed by features other than grooves and ribs or where the key way patterns are transposed (e.g., the holding nuts 240, 250, 260 have key ribs and the holding nut tools 300, 400 have key way grooves).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus configured for insertion into a sensor port of a flow cell, the apparatus comprising: an insert body comprising a first end, a second end axially opposite of the first end, and a surface defining a cavity having an opening at the first end of the insert body and a base at the second end of the insert body; a sensor located in the cavity and comprising a first portion proximate to the base of the cavity, wherein the first portion of the sensor has a first outer diameter; a first insert body holding nut comprising a first side, a second side opposite of the first side, a center opening having an inner diameter greater than the first outer diameter of the first portion of the sensor, and threads encircling the first insert body holding nut between the first side and the second side for engaging with a threaded portion of the interior surface of the sensor port, wherein the second side of the first insert body holding nut is proximate to and applies a compressive force against the first end of the insert body in a first axial direction; and a sensor holding nut comprising: a nut portion comprising a first side, a second side opposite of the first side, and threads encircling the nut portion between the first side and the second side for engaging with the threaded portion of the interior surface of the sensor port, and a cylinder portion comprising a center opening having an inner diameter less than the first outer diameter of the first portion of the sensor, wherein the cylinder portion extends from the second side of the nut portion through the center opening of the first insert body holding nut into the cavity, wherein the distal end of the cylinder portion is proximate to and applies a compressive force against the first portion of the sensor in the first axial direction.

2. The apparatus of claim 1, further comprising:
a second insert body holding nut comprising a first side, a second side opposite of the first side, a center opening having an inner diameter greater than the first outer diameter of the first portion of the sensor, and threads for engaging with the threaded portion of the interior surface of the sensor port, wherein the second side of the second insert body holding nut is proximate to and applies a compressive force against the first side of the first insert body holding nut.

3. The apparatus of claim 1, wherein the sensor further comprises a second portion proximate to the opening of the cavity, wherein the second portion of the sensor has a second outer diameter that is less than the first outer diameter of the first portion of the sensor.

4. The apparatus of claim 3, wherein the inner diameter of the center opening of the cylinder portion of the sensor holding nut is greater than the second outer diameter of the second portion of the sensor.

5. The apparatus of claim 4, wherein the second portion of the sensor extends through the cylinder portion of the sensor holding nut.

6. The apparatus of claim 1, wherein the sensor is a transducer.

7. The apparatus of claim 6, wherein the first portion of the sensor comprises a piezoelectric crystal.

8. The apparatus of claim 1, wherein the first insert body holding nut is a jamb nut.

9. The apparatus of claim 1, further comprising an o-ring installed between the distal end of the cylinder portion and the first portion of the sensor.

10. The apparatus of claim 1, wherein the first outer diameter of the first portion of the sensor is the maximum outer diameter of the sensor.

11. The apparatus of claim 1, wherein the first insert body holding nut comprises a first key way pattern on the first side of the first insert body holding nut.

12. The apparatus of claim 11, wherein the first key way pattern comprises a plurality of key way grooves.

13. The apparatus of claim 1, wherein the sensor holding nut comprises a second key way pattern on the first side of the sensor holding unit.

14. The apparatus of claim 13, wherein the second key way pattern comprises a plurality of key way grooves.

15. The apparatus of claim 14, wherein the first key way pattern is different than the second key way pattern.

16. An apparatus configured for insertion into a sensor port of a flow cell, the apparatus comprising: an insert body comprising a first end, a second end axially opposite of the first end, and a surface defining a cavity; a sensor located in the cavity; a first insert body holding nut comprising a first side, a second side opposite of the first side, a first key way pattern on the first side, and threads encircling the first insert body holding nut between the first side and the second side for engaging with a threaded portion of the interior surface of the sensor port, wherein the second side of the first insert body holding nut is proximate to and applies a compressive force against the first end of the insert body in a first axial direction; and a sensor holding nut comprising a first side, a second side opposite of the first side, a second key way pattern on the first side, and threads encircling the sensor holding nut between the first side and the second side for engaging with the threaded portion of the interior surface of the sensor port, wherein the sensor holding nut applies a compressive force against the first portion of the sensor in the first axial direction, wherein the first key way pattern is different than the second key way pattern.

17. The apparatus of claim 16, wherein the first key way pattern comprises a plurality of key way grooves.

18. An apparatus configured for insertion into a sensor port of a flow cell, the apparatus comprising: an insert body comprising a first end, a second end axially opposite of the first end, and a surface defining a cavity having an opening at the first end of the insert body and a base at the second end of the insert body; a sensor located in the cavity and comprising a first portion proximate to the base of the cavity, wherein the first portion of the sensor has a first outer diameter; a first insert body holding nut comprising a first side, a second side opposite of the first side, a center opening having an inner diameter greater than the first outer diameter of the first portion of the sensor, and threads encircling the first insert body holding nut between the first side and the second side for engaging with a threaded portion of the interior surface of the sensor port, wherein the second side of the first insert body holding nut is proximate to and applies a compressive force against the first end of the insert body in a first axial direction; a second insert body holding nut comprising a first side, a second side opposite of the first side, a center opening having an inner diameter greater than the first outer diameter of the first portion of the sensor, and threads encircling the second insert body holding nut between the first side and the second side for engaging with the threaded portion of the interior surface of the sensor port, wherein the second side of the second insert body holding nut is proximate to and applies a compressive force against the first side of the first insert body holding nut in the first axial direction; and a sensor holding nut comprising: a nut portion comprising a first side, a second side opposite of the first side, and threads encircling the nut portion between the first side and the second side for engaging with the threaded portion of the interior surface of the sensor port, and a cylinder portion comprising a center opening having an inner diameter less than the first outer diameter of the first portion of the sensor, wherein the cylinder portion extends from the second side of the nut portion through the center openings of the first insert body holding nut and the second insert body holding nut into the cavity, wherein the distal end of the cylinder portion is proximate to and applies a compressive force against the first portion of the sensor in the first axial direction.

19. The apparatus of claim 18, wherein first insert body holding nut and the second insert body holding nut comprises: a first key way pattern on the first sides of the first insert body holding nut and the second insert body holding nut and the sensor holding nut comprises a second key way pattern on the first face of the sensor holding unit.

20. The apparatus of claim 19, wherein the first key way pattern is different than the second key way pattern.

* * * * *